US012801868B2

(12) United States Patent
Chakra et al.

(10) Patent No.: US 12,801,868 B2
(45) Date of Patent: Nov. 17, 2026

(54) GENERATING AND SELECTING OPTIMAL TRANSLATIONS FOR USER INTERFACE

(71) Applicant: INTERNATIONAL BUSINESS MACHINES CORPORATION, Armonk, NY (US)

(72) Inventors: Al Chakra, Apex, NC (US); Nathan Montgomery Gurley, Maineville, OH (US); Xiao Xia Mao, Shanghai (CN); Shi Hui Gui, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 18/181,845

(22) Filed: Mar. 10, 2023

(65) Prior Publication Data

US 2024/0303444 A1 Sep. 12, 2024

(51) Int. Cl.

| | |
|---|---|
| ***G06F 40/51*** | (2020.01) |
| ***G06F 8/10*** | (2018.01) |
| ***G06F 8/38*** | (2018.01) |

(52) U.S. Cl.

CPC ................ *G06F 40/51* (2020.01); *G06F 8/10* (2013.01); *G06F 8/38* (2013.01)

(58) Field of Classification Search

CPC ... G06F 40/51; G06F 8/10; G06F 8/38; G06F 40/58

See application file for complete search history.

(56) References Cited

U.S. PATENT DOCUMENTS

| | | | | |
|---|---|---|---|---|
| 5,243,519 A * | 9/1993 | Andrews | ................. | G06F 40/47 704/8 |
| 9,639,528 B1 | 5/2017 | Hoffmann | | |

(Continued)

FOREIGN PATENT DOCUMENTS

| | | | | |
|---|---|---|---|---|
| EP | 2811414 A2 | 12/2014 | | |
| WO | WO-2023218217 A1 * | 11/2023 | ............ | G06F 40/58 |

OTHER PUBLICATIONS

Clear Words Translations, "#TranslationFail 2018—Hilarious Translation Fails This Year", http://clearwordstranslations.com/language/pt/hilarious-translation-fails-2018/, Dec. 27, 2018, 8 Pages.

(Continued)

*Primary Examiner* — Hai Phan
*Assistant Examiner* — Ian Scott Mclean
(74) *Attorney, Agent, or Firm* — Harrity & Harrity, LLP

(57) ABSTRACT

An embodiment for a method of generating and selecting optimal translations for user interfaces by balancing translation integrity and user interface design requirements. The embodiment may receive text to be translated from a first language to a second language within a user interface design context. The embodiment may generate a plurality of translations of the received text, each of the plurality of translations having a respective translation integrity value and text length. The embodiment may calculate a translation deviation range for the received text. The embodiment may determine one or more optimal user interface designs and calculate a guided text length range for the received text. The embodiment may select optimal translation outputs by balancing the respective translation integrity values and the text lengths for each of the generated plurality of translations against the calculated translation deviation range and the calculated guided text length range for the received text.

18 Claims, 5 Drawing Sheets

(56) References Cited

U.S. PATENT DOCUMENTS

| | | | | |
|---|---|---|---|---|
| 10,452,787 | B2 | 10/2019 | Condie | |
| 2013/0271471 | A1 | 10/2013 | Schorsch | |
| 2014/0358519 | A1 | 12/2014 | Mirkin | |
| 2020/0064977 | A1 | 2/2020 | Wu | |
| 2020/0279021 | A1 | 9/2020 | Brandall | |
| 2020/0380216 | A1* | 12/2020 | Fuerstenau | G06N 3/0455 |

OTHER PUBLICATIONS

Kwintessential, "Translation Text Expansion: How it affects Design", https://www.kwintessential.co.uk/blog/translation/translation-text-expansion-how-it-affects-design-2, [Accessed on Jan. 18, 2023], 7 Pages.

Lakew, et al., "Controlling the Output Length of Neural Machine Translation", arXiv:1910.10408v2 [cs.CL], Oct. 25, 2019, 9 Pages.

Tarasiewicz, "How to Recognize Bad Software Localization Companies", ATI, Nov. 28, 2022, 25 Pages. https://www.atltranslate.com/articles/bad-software-localization-companies.

* cited by examiner

GENERATING AND SELECTING OPTIMAL TRANSLATIONS FOR USER INTERFACE

BACKGROUND

The present application relates generally to computers, and more particularly, to generating and selecting optimal translations for user interfaces by balancing translation integrity and user interface design requirements.

Globalization continuously increases the value and utility of translations over time. Many businesses sell products or services across the world, requiring translations from a first language into the many languages of their potential target customers. While translating began as a purely manual process, requiring significant human capital, rapidly improving technology has now provided for a variety of machine translation options. Businesses must consider many factors when translating text, some of which may include, the length of the translated text, the integrity of the translation, and the relevant design requirements based on the specific platform or setting.

SUMMARY

According to one embodiment, a method, computer system, and computer program product for generating and selecting optimal translations for user interfaces by balancing translation integrity and user interface design requirements is provided. The embodiment may include receiving text to be translated from a first language to a second language within a user interface design context. The embodiment may further include generating a plurality of translations of the received text in the second language, each of the plurality of translations having a respective translation integrity value and text length. The embodiment may further include calculating a translation deviation range for the received text. The embodiment may also include determining, based on the user interface design context, one or more optimal user interface designs. The embodiment may further include calculating a guided text length range for the received text based on the one or more optimal user interface designs. The embodiment may also include selecting one or more optimal translation outputs by balancing the respective translation integrity values and the text lengths for each of the generated plurality of translations against the calculated translation deviation range and the calculated guided text length range for the received text.

BRIEF DESCRIPTION OF THE SEVERAL VIEWS OF THE DRAWINGS

These and other objects, features and advantages of the present disclosure will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
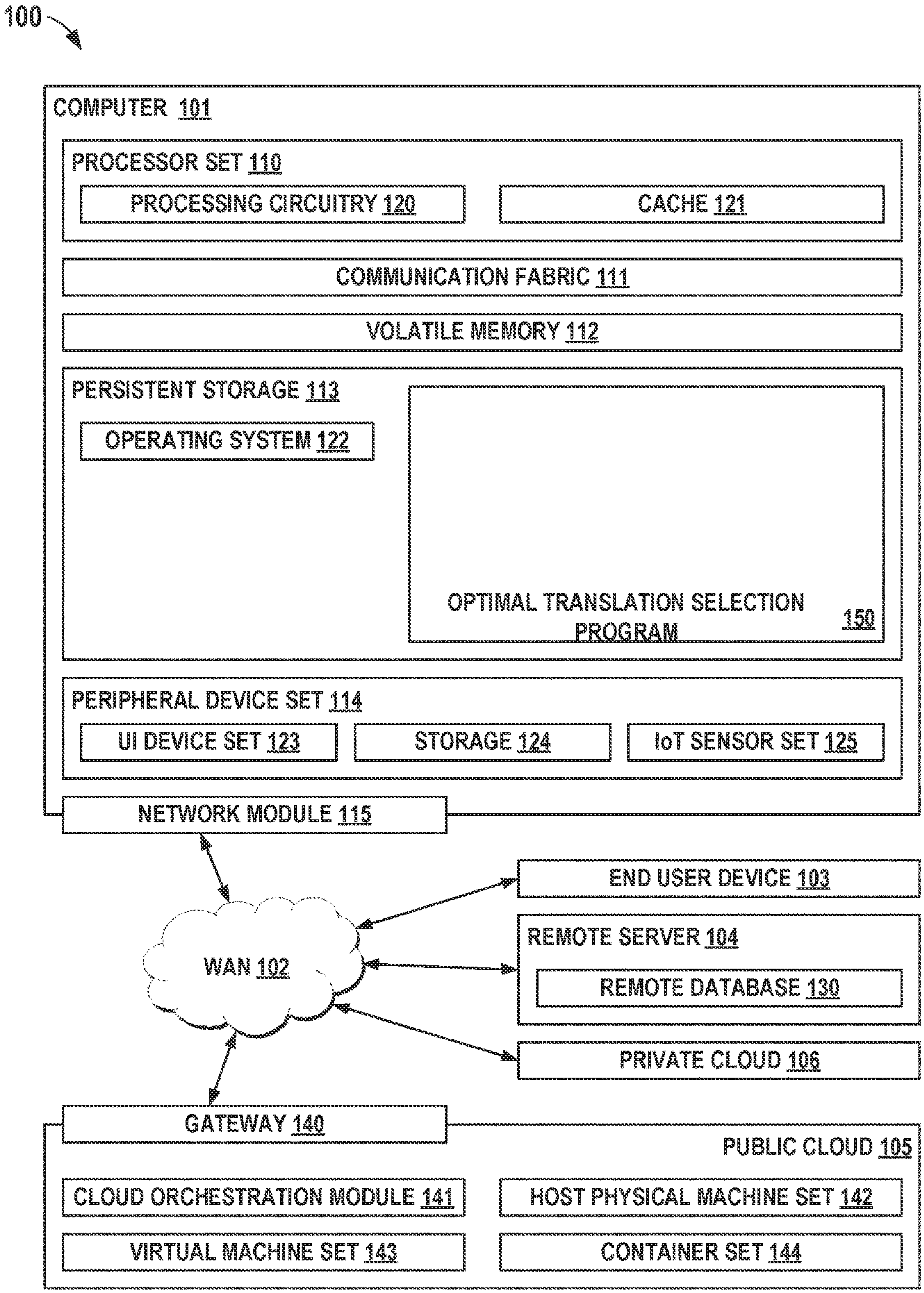
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present application relate generally to computers, and more particularly, to generating and selecting optimal translations for user interfaces by balancing translation integrity and user interface design requirements. The following described exemplary embodiments provide a system, method, and program product to, among other things, receive text to be translated from a first language to a second language within a user interface design context, generate a plurality of translations of the received text in the second language, each of the plurality of translations having a respective translation integrity value and text length, calculate a translation deviation range for the received text, determine, based on the user interface design context, one or more optimal user interface designs, and calculate a guided text length range for the received text based on the one or more optimal user interface designs. Thereafter, described exemplary embodiments may select one or more optimal translation outputs by balancing the respective translation integrity values and the text lengths for each of the generated plurality of translations against the calculated translation deviation range and the calculated guided text length range for the received text. Therefore, the presently described embodiments have the capacity to improve generating and selecting of optimal translations by balancing translation integrity and user interface design requirements. Presently described embodiments may leverage machine learning to generate a plurality of translations for a received text to be translated, to calculate translation integrity values for the generated plurality of translations based on quality assurance (QA) metrics, to generate various design suggestions to determine guided text length ranges for the received text, and to ultimately decide upon an optimal translation by balancing the respective translation integrity values and the text lengths for each of the generated plurality of translations against the calculated translation deviation range and the calculated guided text length range for the received text. This balancing process allows presently described embodiments to select an optimal translation for a given user interface that will have acceptable translation integrity while maintaining design requirements for the applicable user interface design context.

As previously described, globalization continuously increases the value and utility of translations over time. Many businesses sell products or services across the world, requiring translations from a first language into the many languages of their potential target customers. While translating began as a purely manual process, requiring significant human capital, rapidly improving technology has now provided for a variety of machine translation options. Businesses must consider many of factors when translating text, some of which may include, the length of the translated text, the integrity of the translation, and the relevant design requirements based on the specific platform or setting.

Current solutions for translating text are heavily dependent on machine translations which are often unsuitable for managing both translation integrity and relevant design requirements based on the specific user interface design context. This leads many businesses to have to choose between breaking the original user interface (UI) design or changing the text meaning when shipping a product globally due to many variations in the translations. Manual translation may be more effective for considering both translation integrity and design requirements, but this typically involves using human translators to perform the translations. This process may be both time-consuming and costly, as the translators must generate the translations and test if the translated text fits within established design requirements.

Accordingly, a method, computer system, and computer program product for improving generating and selecting of optimal translations by balancing translation integrity and user interface design requirements is provided. The method, system, and computer program product may receive text to be translated from a first language to a second language within a user interface design context. The method, system, computer program product may generate a plurality of translations of the received text in the second language, each of the plurality of translations having a respective translation integrity value and text length. The method, system, computer program product may then calculate a translation deviation range for the received text. Next, the method, system, computer program product may determine, based on the user interface design context, one or more optimal user interface designs. The method, system, computer program product may then calculate a guided text length range for the received text based on the one or more optimal user interface designs. Thereafter, the method, system, computer program product may select one or more optimal translation outputs by balancing the respective translation integrity values and the text lengths for each of the generated plurality of translations against the calculated translation deviation range and the calculated guided text length range for the received text. In turn, the method, system, computer program product has provided for improved generating and selecting of optimal translations by balancing translation integrity and user interface design requirements. Presently described embodiments may leverage machine learning to generate a plurality of translations for a received text, to calculate translation integrity values for each of the plurality of translations based on quality assurance (QA) metrics, to generate various design suggestions to determine guided text length ranges for the received text, and to ultimately decide upon an optimal translation by balancing the respective translation integrity values and the text lengths for each of the generated plurality of translations against the calculated translation deviation range and the calculated guided text length range for the received text. This balancing process allows presently described embodiments to select an optimal translation for a given user interface that will have acceptable translation integrity while maintaining design requirements for the applicable user interface design context. Additionally, presently described embodiments provide an alternative to manual translations performed by human translators which are both time consuming and costly, as translators must manually generate the translations and test if the translated text fits within established design requirements.

The present invention may be a system, a method, and/or a computer program product at any possible technical detail level of integration. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as optimal translation selection program/code 150. In addition to optimal translation selection code 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and optimal translation selection 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in optimal translation selection code 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in optimal translation selection code 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the optimal translation selection program 150 may be a program capable of receiving text to be translated from a first language to a second language within a user interface design context. Optimal translation selection program 150 may generate a plurality of translations of the received text in the second language, each of the plurality of translations having a respective translation integrity value and text length. Optimal translation selection program 150 may then calculate a translation deviation range for the received text. Optimal translation selection program 150 may then determine, based on the user interface design context, one or more optimal user interface designs. Next, optimal translation selection program 150 may calculate a guided text length range for the received text based on the one or more optimal user interface designs. Thereafter, optimal translation selection program 150 may select one or more optimal translation outputs by balancing the respective translation integrity values and the text lengths for each of the generated plurality of translations against the calculated translation deviation range and the calculated guided text length range for the received text. Described embodiments thus provide for improved generating and selecting of optimal translations by balancing translation integrity and user interface design requirements. Presently described embodiments may leverage machine learning to generate a plurality of translations for a received text, to calculate translation integrity values for each of the plurality of translations based on quality assurance (QA) metrics, to generate various design suggestions to determine guided text length ranges for the received text, and to ultimately decide upon an optimal translation by balancing the respective translation integrity values and the text lengths for each of the generated plurality of translations against a calculated translation deviation range and the calculated guided text length range for the received text. This balancing process allows presently described embodiments to select an optimal translation for a given user interface that will have acceptable translation integrity while maintaining design requirements for the applicable user interface design context. Additionally, presently described embodiments provide an alternative to manual translations performed by human translators which are both time consuming and costly, as translators must manually generate the translations and test if the translated text fits within established design requirements.

Figure 2:
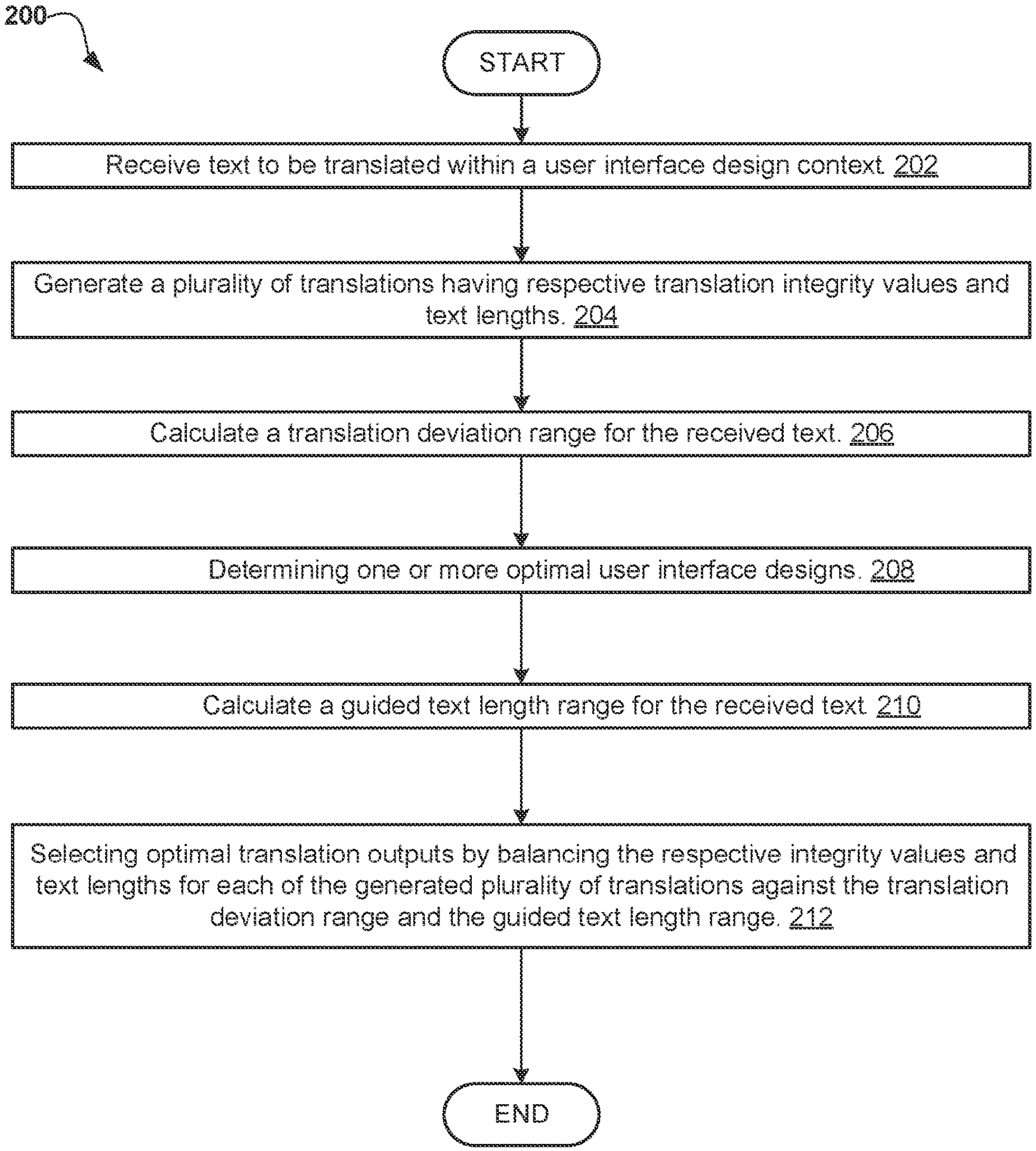
FIG. 2 illustrates an operational flowchart for a process of generating and selecting optimal translations for user interfaces by balancing translation integrity and user interface design requirements according to at least one embodiment.

Referring now to FIG. 2, an operational flowchart is provided depicting an illustrative process 200 of generating and selecting optimal translations for user interfaces by balancing translation integrity and user interface design requirements according to at least one embodiment.

Figure 3:
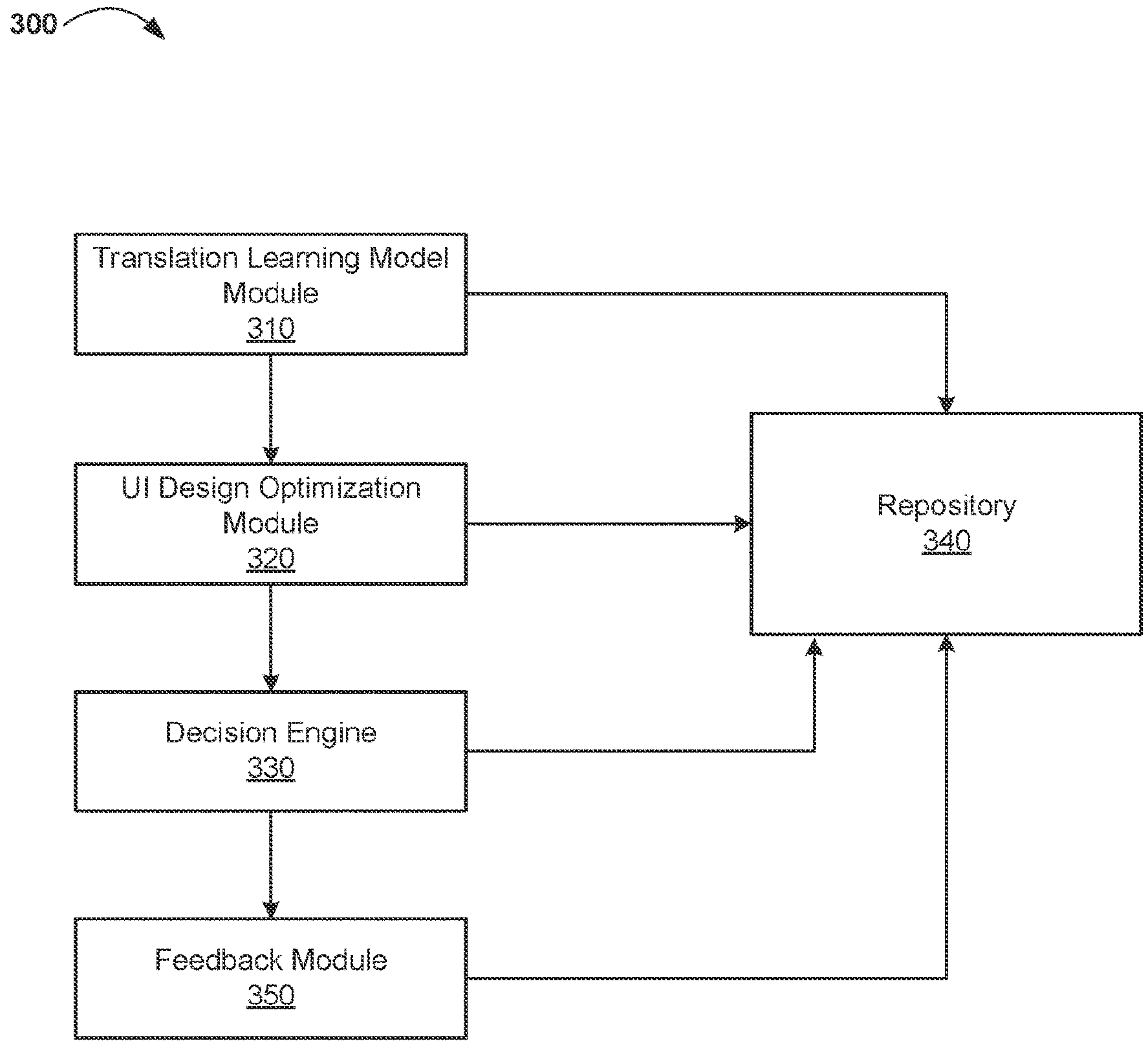
FIG. 3 illustrates exemplary system architecture for performing a process of generating and selecting optimal translations for user interfaces by balancing translation integrity and user interface design requirements according to at least one embodiment.

FIG. 3 illustrates exemplary system architecture 300 usable by an illustrative optimal translation selection program 150 for performing process 200 of generating and selecting optimal translations for user interfaces by balancing translation integrity and user interface design requirements according to at least one embodiment. As shown in FIG. 3, illustrative embodiments of optimal translation selection program 150 may include a translation learning model module 310 for generating a plurality of translations and mapping their respective integrity factors and length changes corresponding to the received text, a UI design optimization module 320 for determining design suggestions and calculating a guided text length range for the received text, and a decision engine 330 for balancing respective translation integrity values and the text lengths for each of the generated plurality of translations against the calculated translation deviation range and the calculated guided text length range for the received text. Exemplary system architecture 300 may further include a repository 340 including stored historical data related to past translation projects including QA metrics considered, UI design samples, and historical translation selections made by an exemplary optimal translation selection program 150 and associated feedback data for the historical selections. Feedback data may be obtained and stored within repository 340 by a feedback module 350 configured to obtain data related to manually received feedback associated with selections made by exemplary translation selection programs in accordance with presently described embodiments.

At 202, optimal translation selection program 150 may receive text to be translated from a first language to a second language within a user interface design context. The received text to be translated may be received in and translated into any suitable known natural languages. The user interface design context may include any design requirements or limitations associated with the environment in which the text will be positioned upon being translated. Optimal translation selection program 150 may be configured to optimize user interface design context for any suitable environment capable of presenting the translated received text, such as, for example, various applications, widgets, or any other suitable environment having a user interface capable of presenting text. Optimal translation selection program 150 may consider a variety of UI design features, such as, for example, sizing requirements, spacing requirements, layout requirements, icon requirements, or any other suitable features for a given environment. For example, at this step, an illustrative optimal translation selection program 150 may receive exemplary text 'T1' to be translated from a first language in which it was received, such as English, to a second language, such as French. Optimal translation selection program 150 will also receive information associated with a user interface design context for 'T1', including sizing, spacing, and layout requirements for the user interface in which the translated text for 'T1' must be presented.

Figure 4:
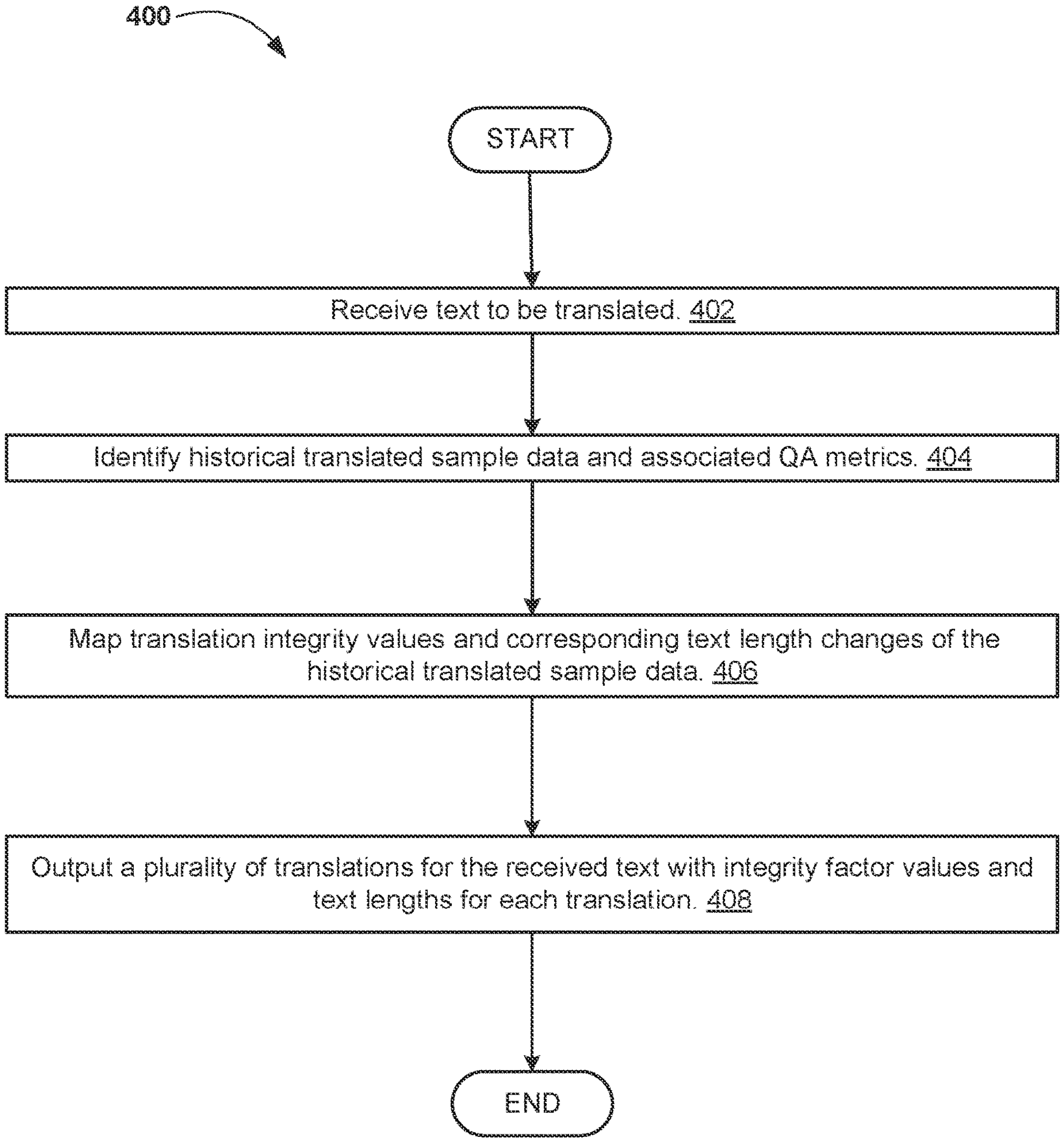
FIG. 4 illustrates an operational flowchart for a process that may be carried out by the exemplary translation learning model module of FIG. 3 according to at least one embodiment.

To perform steps 204-206 of process 200, optimal translation selection program 150 may feed the received text from step 202 into an exemplary translation learning model module 310 as shown in FIG. 3. FIG. 4 illustrates an operational flowchart for an illustrative process 400 that may be carried out by exemplary translation learning model module 310 of an illustrative optimal translation selection program 150 according to at least one embodiment.

At 204, optimal translation selection program 150 may generating a plurality of translations of the received text in the second language, each of the plurality of translations having a respective translation integrity value and text length. In the context of this disclosure, the translation integrity value represents numerical representation of the precision of a translation for its cultural accuracy, linguistic phrasing, terminology, and other linguistic qualities that impact the precision of a given translation. In embodiments, the translation integrity values may be represented numerically on any suitable scale. For example, in embodiments optimal translation selection program 150 may be configured to utilize translation learning model module 310 to calculate translation integrity values between 0 and 100 with numbers closer to 100 representing higher quality translations. In embodiments, the respective integrity values for each generated translation may be calculated by using industrial QA metrics as standards. For example, suitable industrial QA metrics standards may include, the Localization Industry Standards Association Quality Assessment (LISA QA), The Translation Automation User Society Dynamic Quality Framework (TAUS DQF), Society of Automotive Engineers tool J2450 (SAE J2450), multidimensional quality metrics (MQM), or any other suitable known industrial QA metrics standards. In embodiments, the translation integrity values may be further impacted by a variety of translation integrity factors, such as, for example, error rate, fidelity scores measuring how closely the translation adheres to the meaning of the source text, quality scores based on fluency, accuracy, consistency, and/or any other suitable metrics for determining translation quality. In embodiments, the translation integrity factor may further include a component measuring the reading level consistency of the translation by considering the vocabulary, grammar, and sentence structure of the text and how it compares to the source text with respect to an estimated age or education level that may be associated with the source text.

At 204, optimal translation selection program 150 may send the received text to be translated to an exemplary translation learning model module 310 configured to perform an illustrative process 400 shown in FIG. 4. Process 400 leverages a translation learning model to analyze historical translated sample data to identify useful QA metrics and to map integrity factors and text length changes associated with the translated sample data to ensure generation of high-quality translations for the received text to be translated that was received at step 202. The translation learning model may also allow for generation of a plurality of translations having a variety of translation integrity values and associated text lengths to provide for increased flexibility and more options while selecting an optimal translation. In FIG. 4, process 400 begins at 402 with the translation learning model module 310 of optimal translation selection program 150 receiving the text to be translated. At 404 translation learning model module 310 may identify and collect translated sample data and associated QA metrics that were used for each respective translated sample. Next, at 406, translation learning model module 310 may process the historical translated samples to map respective translation integrity values and corresponding text length changes for each respective translated sample. For example, if an exemplary phrase "Hello, how are you?" has 4 different historically accepted translations from English to French stored in the accessible repository, translation learning model module 310 would map the respective translation integrity values for each of the 4 historical translated samples. In embodiments, the translation integrity values for each of the 4 historically accepted translations may be used by optimal translation selection program 150 to recommend how loose or strict the translation integrity value may be for a given translation based on the past experiences. In other words, the historically accepted translations and their associated translation integrity values may be used to generate boundaries that may be used by optimal translation selection program 150 in generating a plurality of translations for newly received text that is similar to the historical samples. Over time, as various translations are generated, selected, and stored by optimal translation selection program 150, translation learning model module 310 may continuously learn and improve at determining how to define the boundaries to strike a balance between the most semantically accurate translation versions and the most-selected versions. Finally, at 408, translation learning model module 310 may generate and output a plurality of translations for the received text, each of the plurality of translations having a respective translation integrity value and text length. The generated plurality of translations may be generated by translation learning model module 310 based upon the historical data processed throughout illustrative process 400 to generate a variety of translations based on differing QA metrics (thus providing for differing respective translation integrity values) and having different respective text lengths. Returning to the example including exemplary text 'T1' discussed above, optimal translation selection program 150, at step 204, may send exemplary text 'T1' to the translation learning model module 310. Optimal translation selection program 150 may then utilize translation learning model module 310 to identify and collect historical sample data for similar text translated from English to French, each translated sample having associated translation QA metrics. The samples would then be processed and translation learning model module 310 would map the translation integrity values and corresponding text length changes for each of the translated samples. Finally, optimal translation selection program 150 would utilize translation learning model module 310 to generate a plurality of translations of text 'T1' into French using translation integrity value boundaries based on the applicable historical samples, each of the generated plurality of translations having their own respective translation integrity values and text lengths depending upon the translation QA metrics involved and the historical samples relied upon. Translation learning model module 310 may utilize advanced machine translation techniques to generate the plurality of translations.

Accordingly, returning to the above example, translation learning model module 310 of optimal translation selection program 150 may, at step 204, generate a first translation of received text 'T1' and use a set of translation QA metrics standards to ultimately determine that the first translation has a calculated translation integrity value of 88 (on a scale from 0 to 100, with 100 being a highest quality translation) and an associated text length, while it may further generate a second translation of received text 'T1' and determine that the second translation has a calculated translation integrity value of only 81 and a second associated text length.

Next at 206, optimal translation selection program 150 may calculate a translation deviation range for the received text. The translation deviation range for a received text may correspond to a numerical range corresponding to upper and lower limits for an amount of translation integrity that may be sacrificed by optimal translation selection program 150 in generating and selecting an optimal translation to output for the received text. For example, in one embodiment optimal translation selection program 150 may calculate a translation deviation range of 5%. This means that for any calculated translation integrity value '$F_n$' associated with a given generated translation, optimal translation selection program 150 may only consider outputting generated translations that maintain the calculated translation integrity value at a number up to 5% below or 5% above the calculated integrity value. This prevents optimal translation selection program 150 from generating or selecting a translation that over sacrifices translation integrity to meet user interface design requirements. In embodiments, optimal translation selection program 150 may calculate the translation deviation range using self-learning on similar historical translation projects contained within the accessible repository 350 (See FIG. 3) as described above in the detailed description of translation learning model module 310 and illustrative process 400. In other embodiments, optimal translation selection program 150 may be configured to include a predetermined translation deviation range set manually by a user.

Figure 5:
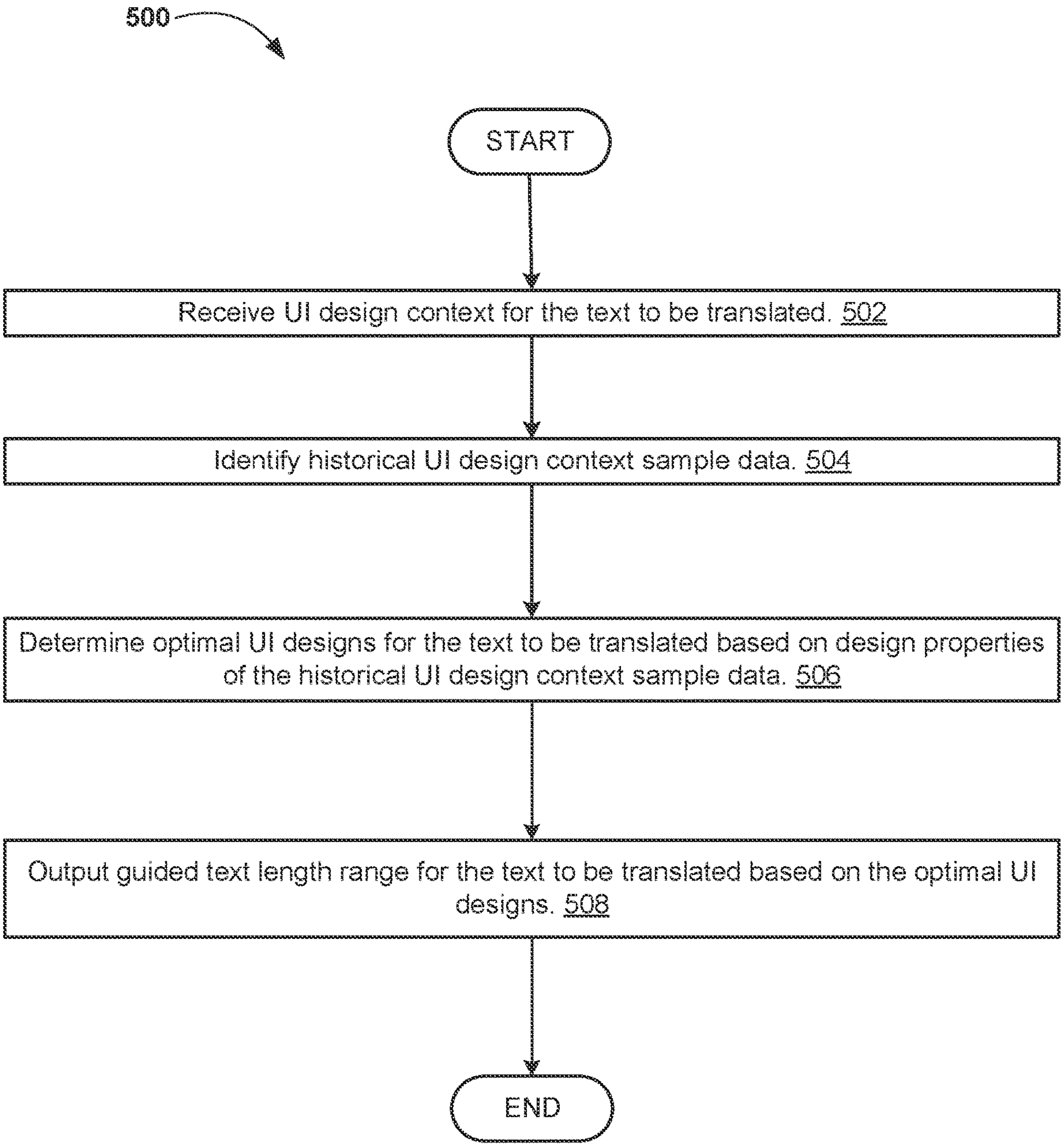
FIG. 5 illustrates an operational flowchart for a process that may be carried out by the exemplary user interface design optimization module of FIG. 3 according to at least one embodiment.

Next at 208, optimal translation selection program 150 may determine, based on the user interface design context, one or more optimal user interface designs for the received text to be translated. Optimal translation selection program 150 may accomplish this by utilizing UI design optimization module 320 shown in FIG. 3 to process the user interface design context associated with the text received at step 202. FIG. 5 illustrates an operational flowchart for an exemplary process 500 that may be carried out by the exemplary user interface design optimization module 320 of FIG. 3 according to at least one embodiment. At step 502, exemplary user interface design optimization module 320 may receive UI design context for the received text to be translated. Next, at 504, UI design optimization module 320 of optimal translation selection program 150 may identify historical UI design context sample data. The identified historical UI design context sample data may be stored data relating to translated text presented within the same application or widget, thus likely providing for examples of translation projects that had similar design requirements. At 506, UI design optimization module 320 of optimal translation selection program 150 may determine optimal UI designs for the text to be translated based on properties of the historical UI design context sample data. To accomplish this, UI design optimization model 320 may generate user interface design suggestions, generated by considering a variety of design properties of the historical design context sample data, such as, for example, sizing suggestions, spacing suggestions, layout suggestions, icon replacements affecting text formatting changes, or any other properties relating to design context that may be usable by UI design optimization module 320 to determine optimal UI design for the received text. In other words, the UI design optimization module 320 allows optimal translation selection program 150 to leverage historical data to fully consider how historical text lengths of previous translated texts may or may not have impacted similar user interface design requirements, thereby allowing for improved determinations regarding the flexibility of a given user interface design context corresponding to a received text to be translated. Thereafter, at 508, UI design optimization model 320 may be configured to calculate and output a guided text length range for the received text to be translated based on the generated optimal user interface designs. The guided text length range may be a numerical representation of the possible lengths of the translated text which will allow the translation to still meet the determined optimal UI design requirements.

At 210, optimal translation selection program 150 may calculate a guided text length range for the received text based on the one or more optimal user interface designs. As discussed above, this step is performed by utilizing UI design optimization model 320 to perform step 508 of illustrative process 500 to generate a guided text length range including a numerical representation of the possible lengths of the translated text which will allow the translation to still meet the determined optimal UI design requirements. At this point in process 200, optimal translation selection program 150 has now leveraged machine learning to generate a plurality of translations having respective translation integrity values, and to calculate a guided text length range based upon determining optimal UI designs. Additionally, optimal translation selection program 150 has identified two constraints in the form of numerical ranges for an optimal translation for the received text. The first constraint is related to the calculated translation deviation value (translation integrity constraint), and the second constraint is related to the calculated guided text length range (text length constraint). Both constraints may be leveraged to ensure an optimal translation is selected.

Lastly, at 212, optimal translation selection program 150 may select one or more optimal translation outputs by balancing the respective translation integrity values and the text lengths for each of the generated plurality of translations against the calculated translation deviation range and the calculated guided text length range for the received text. As discussed above, each of the generated plurality of translations generated by optimal translation selection program 150 includes a respective translation integrity value and text length. At this step, optimal translation selection program 150 is configured to select an optimal translation for a given user interface by balancing the translation integrity values and text lengths of each translation against the UI design requirements. Optimal translation selection program 150 balances these factors using the calculated translation deviation range and the calculated guided text length range discussed above. At this step, optimal translation selection program 150 may utilize an exemplary decision engine 330 as shown in FIG. 3 to balance the respective translation integrity values and the text lengths for each of the generated plurality of translations against the calculated translation deviation range and the calculated guided text length range for the received text. For example, in one embodiment, optimal translation selection program may generate 3 exemplary translations 'T1', 'T2', and 'T3' for an exemplary 'Text X' to be translated. Each translation may have a respective integrity value $IV_1$, $IV_2$, and $IV_3$, and a respective text length of $L_1$, $L_2$, and $L_3$. At this step, optimal translation selection program 150 may balance the integrity value and text length for each translation against a calculated translation deviation requirement for exemplary 'Text X' and the calculated guided text length range based on the user interface design context associated with exemplary 'Text X'. Optimal translation selection program 150 may then select one or more optimal translation outputs selected from exemplary translations 'T1', 'T2', and 'T3' having translation integrity values falling within the calculated translation deviation range, but that also include a text length that does not exceed the calculated guided text length range for exemplary 'Text X'. Accordingly, optimal translation selection program 150 has determined which of the generated translations are high-quality translations that are both accurate and precise that also include a text length that falls within an ideal text length range (calculated guided text length range) based on the user interface design context associated with the received text being translated. In embodiments, the one or more selected optimal translation outputs may be presented to the user with one or more of translation integrity values, translation deviation percentages, and text length.

In embodiments, optimal translation selection program 150 may further include a feedback module 340 configured to allow a user to select from the one or more optimal translation outputs and to provide useful feedback regarding the accuracy of selection made by optimal translation selection program 150. For example, in embodiments a user may provide positive feedback if the optimal translation output had satisfactory translation integrity and fit within a given user interface design context without resulting in unwanted challenges relating to any of the user interface design context properties discussed above (i.e., spacing, layout, sizing, etc.). In embodiments, data gathered by optimal translation selection program 150 at any of translation learning model module 310, UI design optimization module 320, decision engine 330, or feedback module 340 may be stored within a suitable database or storage system within repository 340 to function as usable historical data for future translation projects.

It will be appreciated that optimal translation selection program 150 thus provides for improved generating and selecting of optimal translations by balancing translation integrity and user interface design requirements. Presently described embodiments may leverage machine learning to generate a plurality of translations for a received text, to calculate translation integrity values for each of the plurality of translations based on quality assurance (QA) metrics, to generate various design suggestions to determine guided text length ranges for the received text, and to ultimately decide upon an optimal translation by balancing the respective translation integrity values and the text lengths for each of the generated plurality of translations against a calculated translation deviation range and the calculated guided text length range for the received text. This balancing process allows presently described embodiments to select an optimal translation for a given user interface that will have acceptable translation integrity while maintaining user interface design requirements for the applicable user interface design context. Additionally, presently described embodiments provide an alternative to manual translations performed by human translators which are both time consuming and costly, as translators must manually generate the translations and test if the translated text fits within established design requirements. Presently described embodiments further utilize machine learning models configured to leverage (and add to through a feedback module) historical data stored in a repository to continuously improve at generating a plurality of translations, calculating translation deviation ranges, and determining optimal user interface design contexts in order to calculate guided text length ranges associated with a given received text to be translated. This further allows presently described embodiments to constantly improve at selecting optimal translations for a given user interface design context by balancing translation integrity values and text lengths of generated translations against calculated translation deviation ranges and calculated guided text length ranges.

It may be appreciated that FIG. 2 provides only illustrations of an exemplary implementation and does not imply any limitations with regard to how different embodiments may be implemented. Many modifications to the depicted environment may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of generating and selecting an optimal translation for a user interface comprising:

receiving text to be translated from a first language to a second language within a user interface design context, the user interface design context including any design requirements or limitations associated with an environment in which text will be positioned upon being translated;

employing a translation learning model module configured to learn from historical translated sample data from a repository storing historical data related to historical user interface design samples, the translation learning model module configured to generate a plurality of translations of the received text within the user interface design context in the second language, each of the generated plurality of translations having a respective translation integrity value and text length;

calculating a translation deviation range for the received text;

determining, based on the user interface design context and historical user interface design context sample data related to user interfaces with similar user interface design requirements, one or more optimal user interface designs;

calculating a guided text length range for the received text based on the one or more optimal user interface designs, the guided text length range being a numerical representation of possible lengths of translated text which allow the translated text to meet user interface design requirements; and selecting one or more optimal translation outputs by balancing the respective translation integrity value for each of the generated plurality of translations and the text lengths for each of the generated plurality of translations against the calculated translation deviation range and the calculated guided text length range for the received text in a balancing process, the balancing process allowing selection of an optimal translation for a given user interface that has an acceptable translation integrity while maintaining design requirements for the user interface design.

2. The computer-based method of claim 1, wherein the respective translation integrity value for each of the generated plurality of translations is generated by applying one or more quality assurance metric standards to each of the generated plurality of translations.

3. The computer-based method of claim 1, wherein the translation deviation range is calculated based on self-learning on similar historical translation projects stored within the repository.

4. The computer-based method of claim 1, further comprising:

employing a user interface design optimization module configured to process and leverage the historical user interface design context sample data to generate layout suggestions for the one or more optimal user interface designs.

5. The computer-based method of claim 4, wherein the generated layout suggestions include one or more of optimal sizing suggestions, spacing suggestions, layout suggestions, and icon replacement suggestions.

6. The computer-based method of claim 1, further comprising:

storing feedback received from a user related to the one or more selected optimal translation outputs within a repository.

7. A computer system, the computer system comprising:

one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:

receiving text to be translated from a first language to a second language within a user interface design context, the user interface design context including any design requirements or limitations associated with an environment in which text will be positioned upon being translated;

employing a translation learning model module configured to learn from historical translated sample data from a repository storing historical data related to historical user interface design samples, the translation learning model module configured to generate a plurality of translations of the received text within the user interface design context in the second language, each of the generated plurality of translations having a respective translation integrity value and text length;

calculating a translation deviation range for the received text;

determining, based on the user interface design context and historical user interface design context sample data related to user interfaces with similar user interface design requirements, one or more optimal user interface designs;

calculating a guided text length range for the received text based on the one or more optimal user interface designs, the guided text length range being a numerical representation of possible lengths of translated text which allow the translated text to meet user interface design requirements; and selecting one or more optimal translation outputs by balancing the respective translation integrity value for each of the generated plurality of translations and the text lengths for each of the generated plurality of translations against the calculated translation deviation range and the calculated guided text length range for the received text in a balancing process, the balancing process allowing selection of an optimal translation for a given user interface that has an acceptable translation integrity while maintaining design requirements for the user interface design.

8. The computer system of claim 7, wherein the respective translation integrity value for each of the generated plurality of translations is generated by applying one or more quality assurance metric standards to each of the generated plurality of translations.

9. The computer system of claim 7, wherein the translation deviation range is calculated based on self-learning on similar historical translation projects stored within the repository.

10. The computer system of claim 7, further comprising:

employing a user interface design optimization module configured to process and leverage the historical user interface design context sample data to generate layout suggestions for the one or more optimal user interface designs.

11. The computer system of claim 10, wherein the generated layout suggestions include one or more of optimal sizing suggestions, spacing suggestions, layout suggestions, and icon replacement suggestions.

12. The computer system of claim 7, further comprising:

storing feedback received from a user related to the one or more selected optimal translation outputs within a repository.

13. A computer program product, the computer program product comprising:

one or more computer-readable tangible storage medium and program instructions stored on at least one of the one or more computer-readable tangible storage medium, the program instructions executable by a processor capable of performing a method, the method comprising:

receiving text to be translated from a first language to a second language within a user interface design context, the user interface design context including any design requirements or limitations associated with an environment in which text will be positioned upon being translated;

employing a translation learning model module configured to learn from historical translated sample data from a repository storing historical data related to historical user interface design samples, the translation learning model module configured to generate a plurality of translations of the received text within the user interface design context in the second language, each of the generated plurality of translations having a respective translation integrity value and text length;

calculating a translation deviation range for the received text;

determining, based on the user interface design context and historical user interface design context sample data related to user interfaces with similar user interface design requirements, one or more optimal user interface designs;

calculating a guided text length range for the received text based on the one or more optimal user interface designs, the guided text length range being a numerical representation of possible lengths of translated text which allow the translated text to meet user interface design requirements; and selecting one or more optimal translation outputs by balancing the respective translation integrity value for each of the generated plurality of translations and the text lengths for each of the generated plurality of translations against the calculated translation deviation range and the calculated guided text length range for the received text in a balancing process, the balancing process allowing selection of an optimal translation for a given user interface that has an acceptable translation integrity while maintaining design requirements for the user interface design.

14. The computer program product of claim 13, wherein the respective translation integrity value for each of the generated plurality of translations is are-generated by applying one or more quality assurance metric standards to each of the generated plurality of translations.

15. The computer program product of claim 13, wherein the translation deviation range is calculated based on self-learning on similar historical translation projects stored within an accessible repository.

16. The computer program product of claim 13, further comprising:

employing a user interface design optimization module configured to process and leverage the historical user interface design context sample data to generate layout suggestions for the one or more optimal user interface designs.

17. The computer program product of claim 16, wherein the generated layout suggestions include one or more of optimal sizing suggestions, spacing suggestions, layout suggestions, and icon replacement suggestions.

18. The computer program product of claim 13, further comprising:

storing feedback received from a user related to the one or more selected optimal translation outputs within a repository.

* * * * *